United States Patent
Ocomatl Quiroz et al.

(10) Patent No.: US 9,920,792 B2
(45) Date of Patent: Mar. 20, 2018

(54) SPRING RETAINER PLATE WITH LANCED RIVET TABS

(71) Applicant: Schaeffler Technologies AG & Co. KG, Herzogenaurach (DE)

(72) Inventors: Carlos Antonio Ocomatl Quiroz, Pue (MX); Alfredo Jimenez Perez Mitre, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 202 days.

(21) Appl. No.: 14/955,900

(22) Filed: Dec. 1, 2015

(65) Prior Publication Data

US 2016/0160931 A1 Jun. 9, 2016

Related U.S. Application Data

(60) Provisional application No. 62/088,287, filed on Dec. 5, 2014.

(51) Int. Cl.

| | |
|---|---|
| *F16D 3/12* | (2006.01) |
| *F16H 41/24* | (2006.01) |
| *F16H 41/04* | (2006.01) |
| *F16H 45/02* | (2006.01) |
| *F16F 15/123* | (2006.01) |

(52) U.S. Cl.
CPC .......... *F16D 3/12* (2013.01); *F16F 15/12366* (2013.01); *F16H 41/04* (2013.01); *F16H 41/24* (2013.01); *F16H 45/02* (2013.01); *F16F 2226/04* (2013.01); *F16H 2045/0221* (2013.01); *F16H 2045/0247* (2013.01)

(58) Field of Classification Search
CPC . F16D 3/12; F16F 15/12366; F16F 15/12386; F16F 15/1343; F16F 15/13453; F16F 15/13469; F16F 15/13476; F16F 15/13484; F16F 2226/04; F16H 41/04; F16H 41/24; F16H 45/02; F16H 2045/0221; F16H 2045/0231; F16H 2045/0247
See application file for complete search history.

(56) References Cited

U.S. PATENT DOCUMENTS

| | | | |
|---|---|---|---|
| 7,585,226 B2 | 9/2009 | Uhler et al. | |
| 8,839,925 B2 * | 9/2014 | Uchi | F16H 45/02 192/205 |
| 2015/0260257 A1 | 9/2015 | Jimenez Perez Mitre et al. | |

* cited by examiner

*Primary Examiner* — Logan Kraft

(57) ABSTRACT

A torsional vibration damper, including: an axis of rotation; a spring retainer plate including a plurality of openings passing through and wholly surrounded by material forming the spring retainer plate and a plurality of rivet tabs, each rivet tab including a respective portion aligned with a respective opening from the plurality of openings so that a line in an axial direction, parallel to the axis of rotation, passes through the respective portion and the respective opening; an intermediate plate; a plurality of rivets passing through the plurality of rivet tabs and connecting the intermediate plate to the spring retainer plate; and a plurality of springs engaged with the spring retainer plate.

20 Claims, 10 Drawing Sheets

SPRING RETAINER PLATE WITH LANCED RIVET TABS

CROSS-REFERENCE TO RELATED APPLICATIONS

This application claims the benefit under 35 U.S.C. § 119(e) of U.S. Provisional Patent Application No. 62/088,287, filed Dec. 5, 2014, which application is incorporated herein by reference in its entirety.

TECHNICAL FIELD

The present disclosure relates generally to a spring retainer plate with lanced tabs, in particular, tabs forming a planar surface for receiving rivets and fastening a spring stop without interfering with springs housed in the spring retainer plate.

BACKGROUND

Known serial torsional vibration dampers include a spring retainer plate, an intermediate plate, and an output flange. A first set of springs is retained by and engaged with the spring retainer plate and engaged with the cover plate. A second set of springs is engaged with the intermediate plate and the output plate. The second set of springs can be engaged with the spring retainer plate as well. Typically, the spring retainer plate and the intermediate plate are non-rotatably connected, for example by rivets, in particular sheet metal rivets. Ideally the rivets are placed near openings in the spring retainer plate for the first set of springs without interfering with operation of the first set of springs. However, the portion of the spring retainer plate best suited for receiving the rivets is curved to form the outermost portion of the spring retainer plate, which retains the first set of springs in axial and radial directions. In other words, without this increment on the holes diameter placement, the contact wouldn't be uniform between these components surfaces (sheet metal rivets and flange tabs). Also, in order to get more clearance between the flange stop radius and the sheet metal rivet flat surfaces, the diameter of the sheet metal rivet holes are increased to avoid radial stack-up issues between components. The rivet heads contact the curved surface of the spring retainer, which degrades the strength and durability of the rivet connection.

SUMMARY

The present disclosure broadly comprises a torsional vibration damper, including: an axis of rotation; a spring retainer plate including a plurality of openings passing through and wholly surrounded by material forming the spring retainer plate; and a plurality of rivet tabs, each rivet tab including a respective portion aligned with a respective opening from the plurality of openings so that a line in an axial direction, parallel to the axis of rotation, passes through the respective portion and the respective opening; an intermediate plate; a respective at least one rivet passing through said each rivet tab and connecting the intermediate plate to the spring retainer plate; and a plurality of springs engaged with the spring retainer plate.

The present disclosure broadly comprises a torsional vibration damper, including: an axis of rotation and a spring retainer plate. The spring retainer plate includes: a first plurality of openings passing through and wholly surrounded by the spring retainer plate; and a plurality of rivet tabs, each rivet tab including a respective portion positioned such that a respective first line in an axial direction, parallel to the axis of rotation, passes through the respective portion and the respective opening and a second line, in a circumferential direction formed by an end point of a radius rotated about the axis of rotation, passes through the first plurality of openings and the respective first lines without touching the plurality of rivet tabs. The damper includes: an intermediate plate; a respective plurality of rivets passing through said each rivet tab and fixedly connecting the intermediate plate to the spring retainer plate; and a first plurality of springs engaged with the intermediate plate and restrained in the axial direction and in a radial direction, orthogonal to the axis of rotation, by the spring retainer plate.

The present disclosure broadly comprises torque converter, including: an axis of rotation; a cover arranged to receive torque; an impeller non-rotatably connected to the cover; a turbine; and a torsional vibration damper including an intermediate plate, a spring retainer plate including a first plurality of openings passing through and wholly surrounded by material forming the spring retainer plate, a plurality of rivet tabs, each rivet tab including a respective second plurality of openings and aligned with a respective opening from the first plurality of openings in an axial direction parallel to the axis of rotation; and a radially outermost curved portion forming a substantially C shape in a radial cross-section; a respective plurality of rivets passing through each respective second plurality of openings and non-rotatably connecting the intermediate plate to the spring retainer plate; and a plurality of springs disposed in the radially outermost curved portion and engaged with the intermediate plate. A second line, in a circumferential direction, formed by an end point of a radius rotated about the axis of rotation, passes through the first plurality of openings without passing through the plurality of rivet tabs.

BRIEF DESCRIPTION OF THE DRAWINGS

The nature and mode of operation of the present disclosure will now be more fully described in the following detailed description of the present disclosure taken with the accompanying figures, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
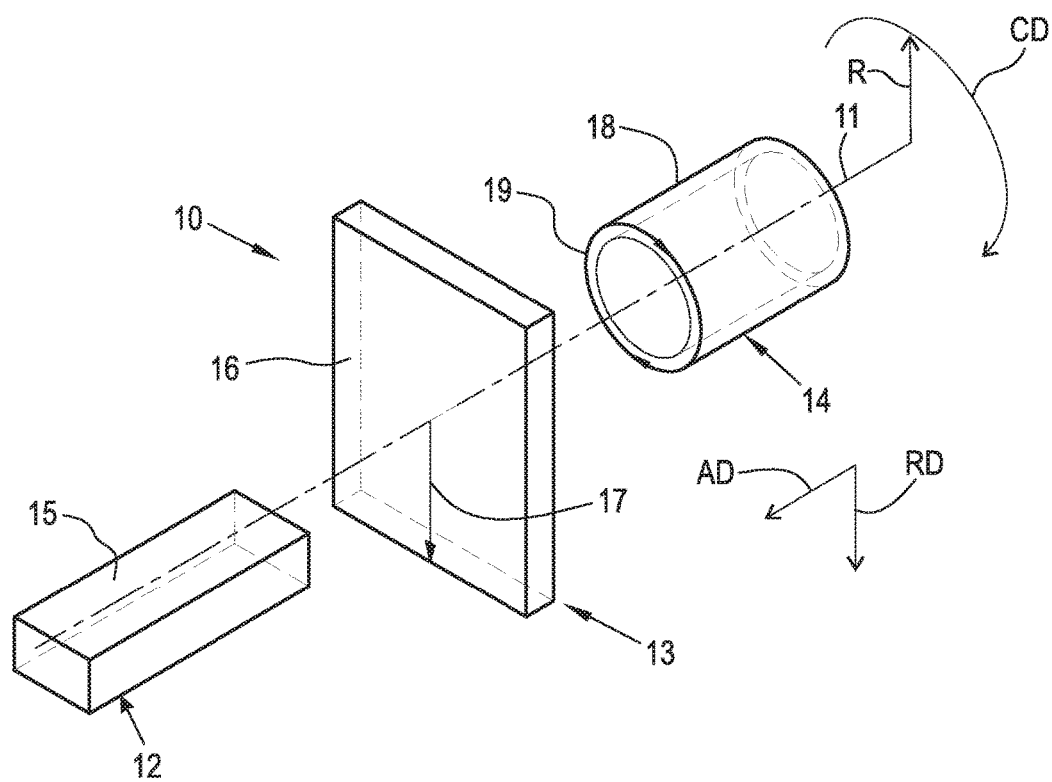
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
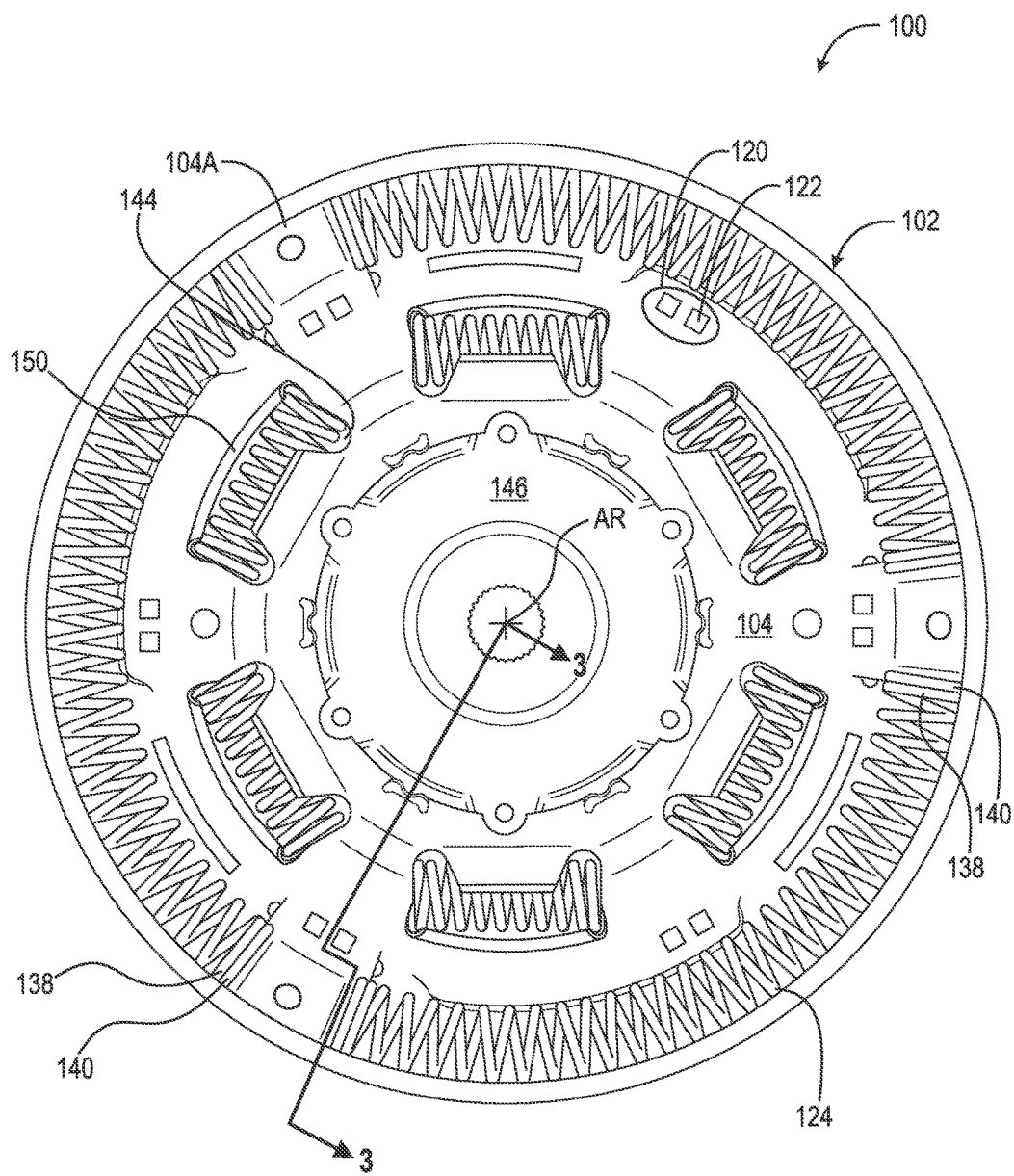
FIG. 2 is a front view of a torsional vibration damper with lanced spring stops.

FIG. 2 is a front view of torsional vibration damper 100 with lanced spring stops.

Figure 3:
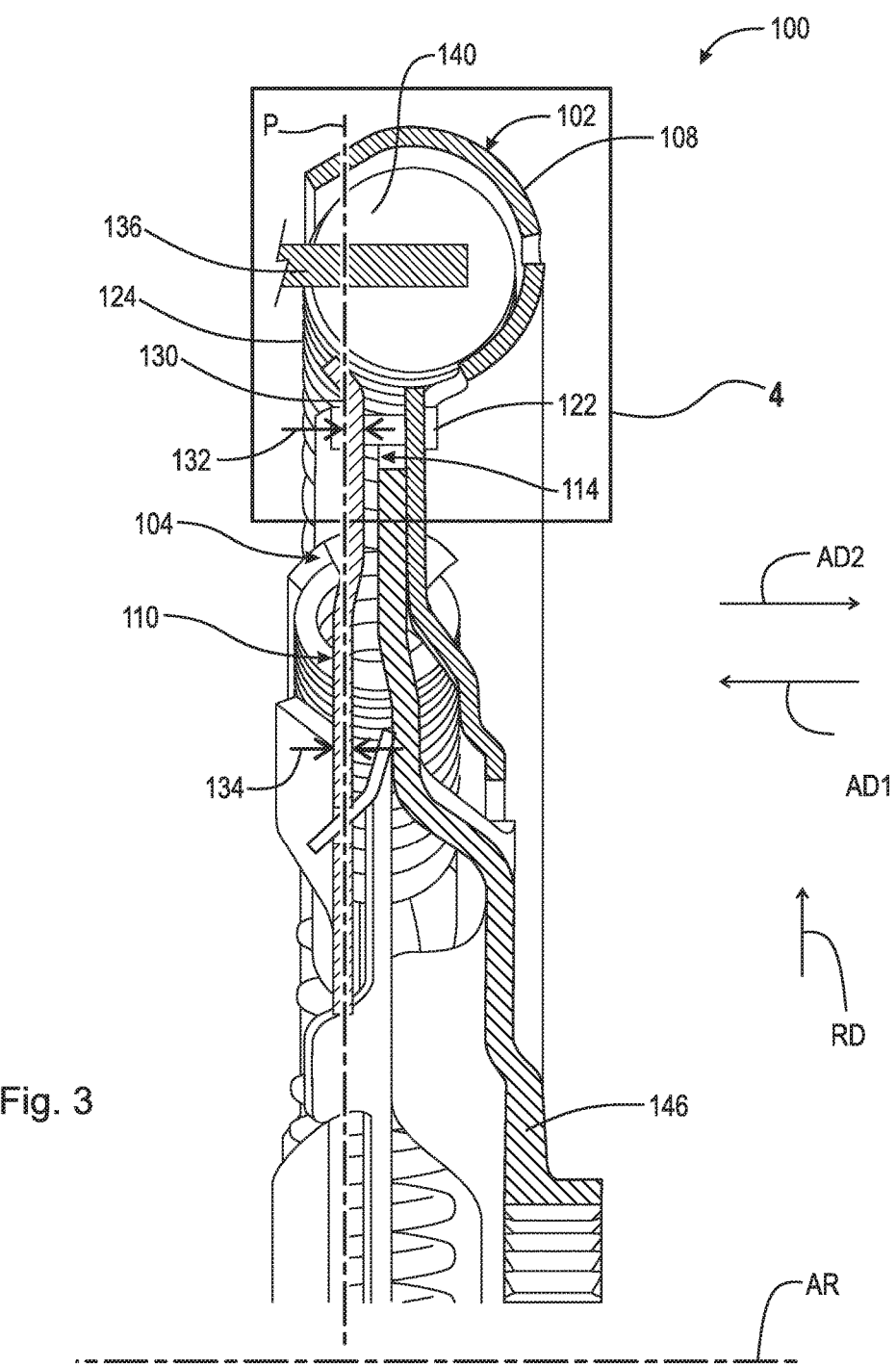
FIG. 3 is a cross-sectional view generally along line 3-3 in FIG. 2.

FIG. 3 is a cross-sectional view generally along line 3-3 in FIG. 2.

Figure 4:
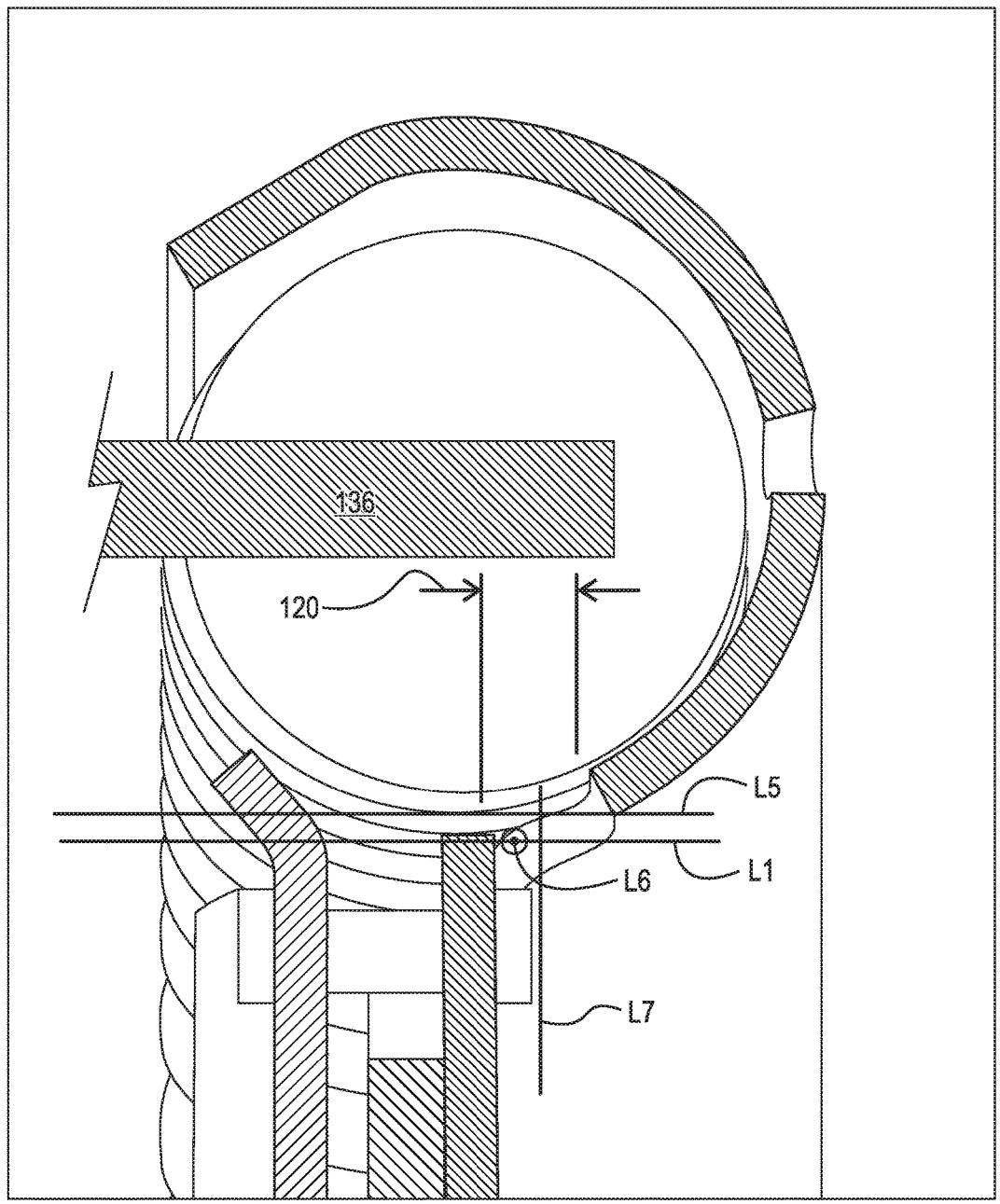
FIG. 4 is a cross-sectional view generally along line 4-4 in FIG. 2.

FIG. 4 is a cross-sectional view generally along line 4-4 in FIG. 2.

Figure 5:
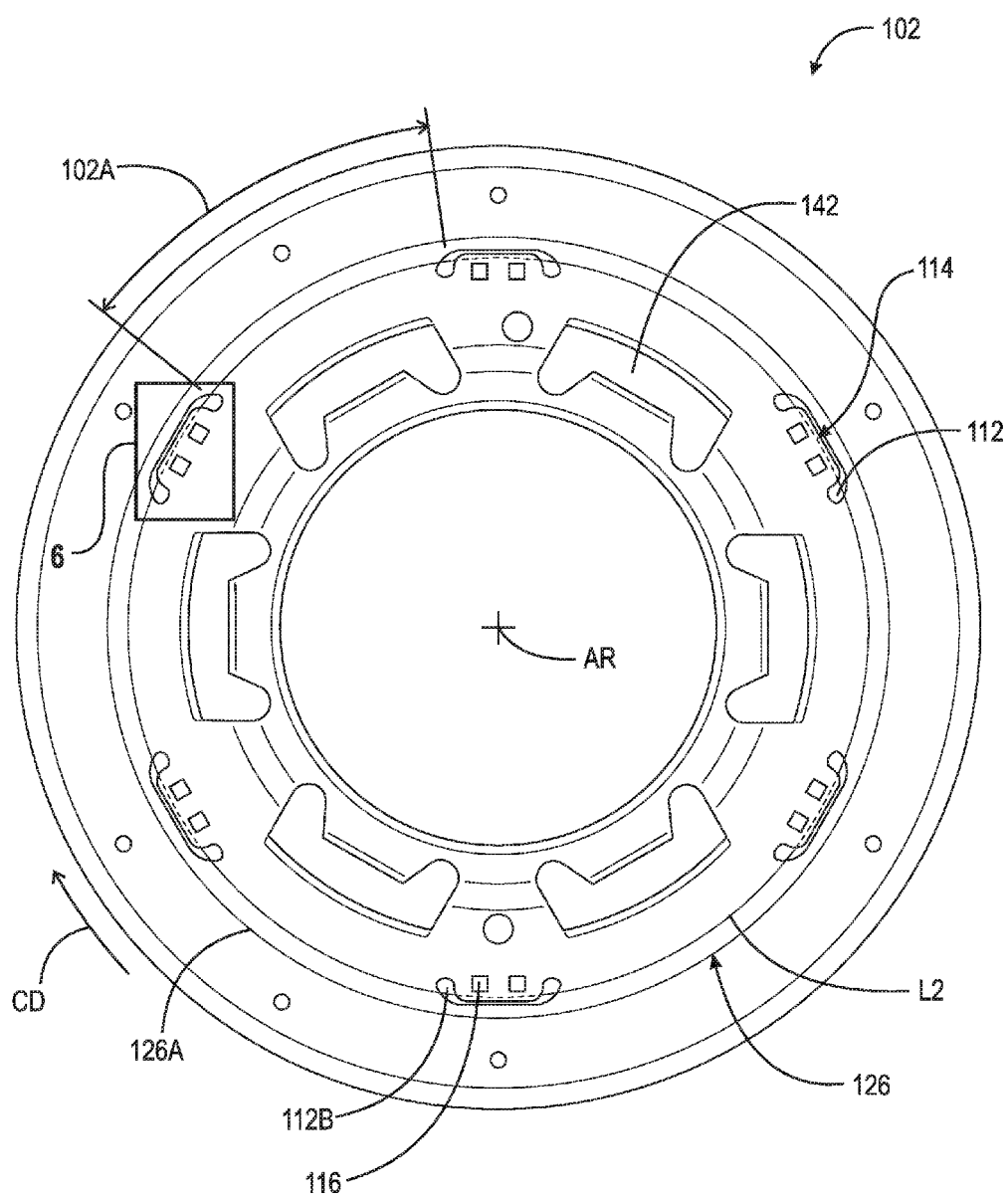
FIG. 5 is a front view of the spring retainer plate in FIG. 2.

FIG. 5 is a front view of the spring retainer plate in FIG. 2. The following should be viewed in light of FIGS. 2 through 5. Torsional vibration damper 100 includes axis of rotation AR, spring retainer plate 102, and intermediate plate 104. Plate 102 includes radially outermost portion 108, side 110, and openings 112 passing through and wholly surrounded by material forming plate 102. That is, the material forming plate 102 forms the respective entire boundary of openings 112.

Figure 6:
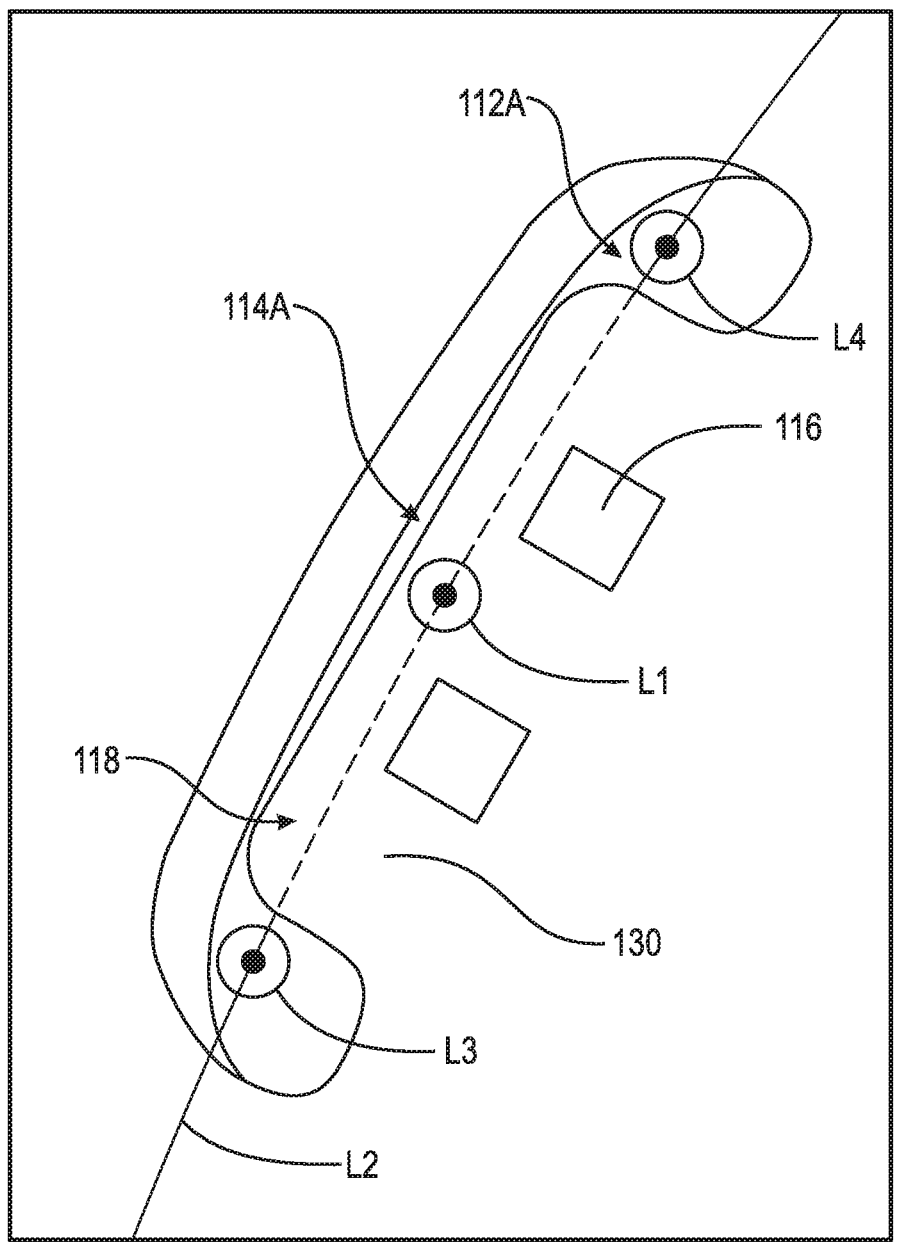
FIG. 6 is a detail of area 6 in FIG. 5.

FIG. 6 is a detail of area 6 in FIG. 5. The following should be viewed in light of FIGS. 2 through 6. Plate 102 includes rivet tabs 114 including openings 116. Each rivet tab 114, for example, tab 114A, includes respective portion 118 aligned with a respective opening 112, for example, opening 112A, so that line L1 passes through the respective portion 118 and a respective opening 112.

Damper 100 includes rivets 122 and springs 124 engaged with plate 102. Rivets 122 connect intermediate plate 104 and retainer 102. In an example embodiment, rivets 122 non-rotatably connect plates 102 and 104. By "non-rotatably connect" we mean that plate 102 rotates whenever plate 104 rotates and plate 104 rotates whenever plate 102 rotates. Rivets 122 pass through openings 116 in tabs 114.

In an example embodiment, line L2, in circumferential direction CD, passes through each and every rivet tab 114 without passing through portions 102A of plate 102 circumferentially located between rivet tabs 114. Stated otherwise, tabs 114 are axially offset from portions 102A, for example by extent 120. In an example embodiment, for each tab 114, for example as shown for tab 114A, respective lines L3 and L4, in axial direction AD1: pass through line L2 and the respective opening 112, for example, opening 112A; and are separated, in circumferential direction CD, by the rivet tab, for example, tab 114A.

Figure 7:
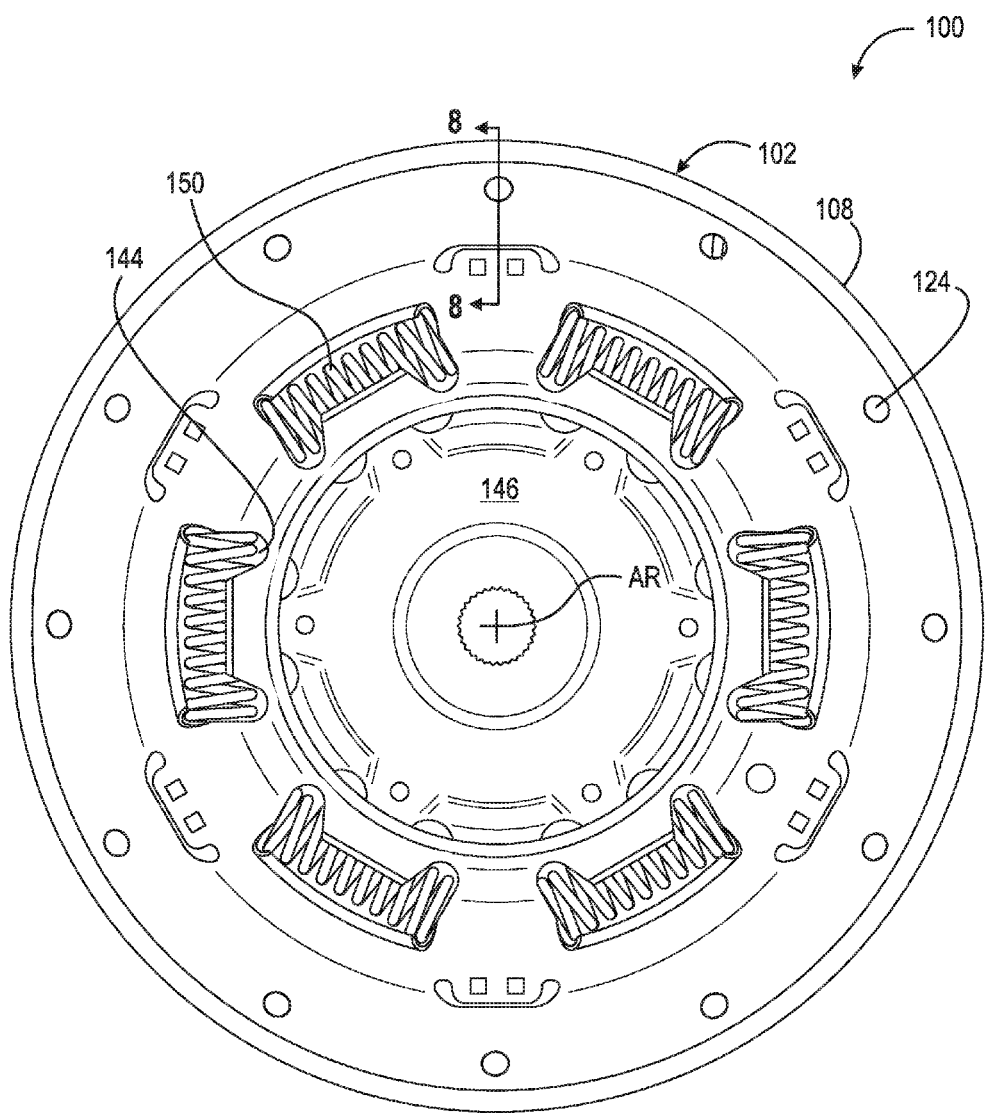
FIG. 7 is a back view of the torsional vibration damper shown in FIG. 2.

FIG. 7 is a back view of torsional vibration damper 100 shown in FIG. 2.

Figure 8:
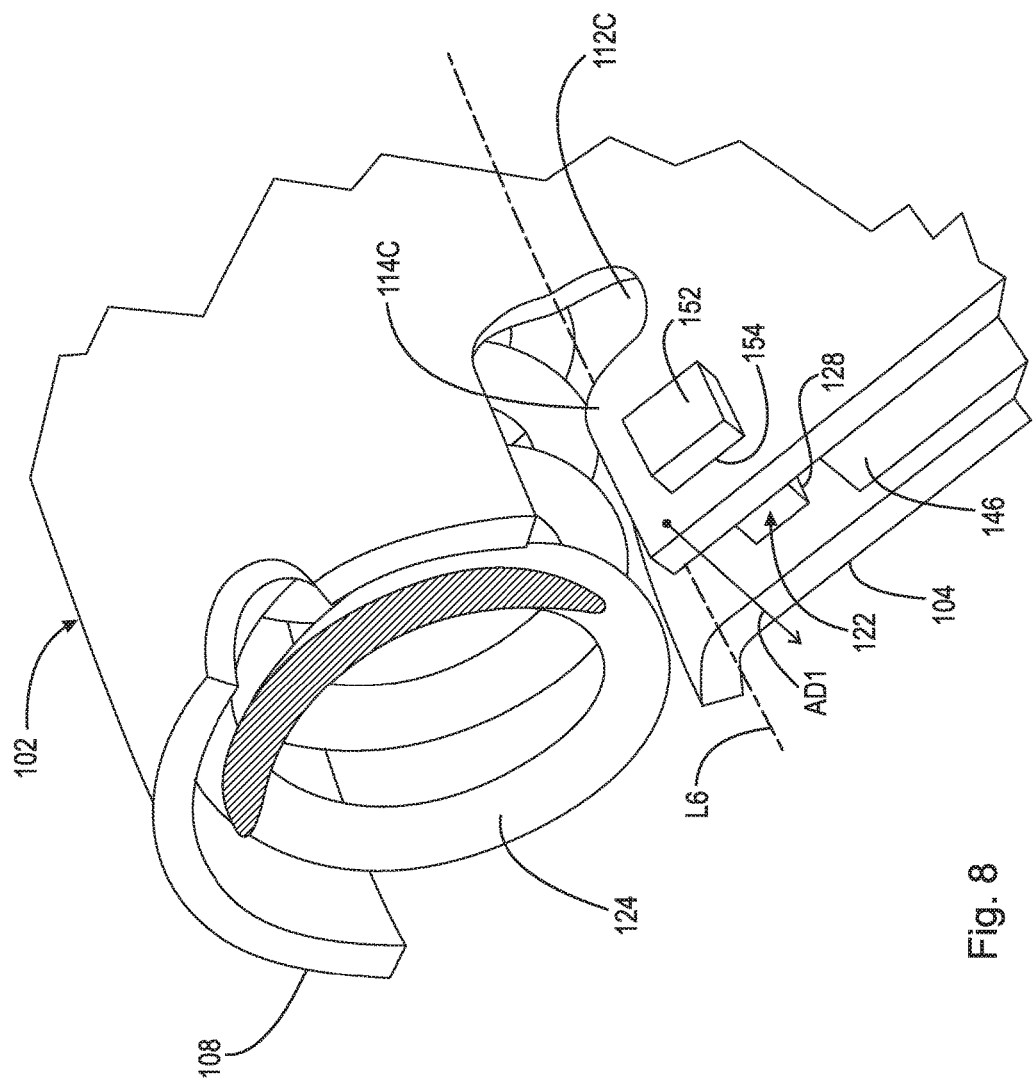
FIG. 8 is a perspective cross-sectional view generally along line 8-8 in FIG. 7.

FIG. 8 is a cross-sectional view general along line 8-8 in FIG. 6. The following should be viewed in light of FIGS. 2 through 7. In an example embodiment, for each opening 112, for example, opening 112A, respective line L5, in axial direction AD1 passes through opening 112A without touching a respective rivet tab 114, for example, rivet tab 114A, at least partially bounded by the opening; and is radially outward of the respective rivet tab. In an example embodiment, line L6, in circumferential direction CD, passes through openings 112 without passing through any of tabs 114. In an example embodiment, line L6 passes through the respective lines L1. In an example embodiment, for each opening 112, for example, opening 112A, respective line L7, orthogonal to axis AR, passes through opening 112A without touching a respective rivet tab 114, for example, rivet tab 114A.

Spring retainer plate 102 includes edges 126 in side 110. Each edge 126 connects two adjacent openings 112 in circumferential direction CD, for example, edge 126A connects openings 112B and 112C. Plate 102 includes radially outermost curved portion 108. Portion 108 forms substantially a C shape in a radial cross-section, for example as shown in FIGS. 3, 4 and 8, and borders edges 126. At least a portion of each spring 124 is located in curved portion 108. Curved portion 108 restrains springs 124 in radially outward direction RD, and in directions AD1 and AD2. In an example embodiment, portion 108 is continuous in circumferential direction CD. Rivets 122 pass through openings 128 in plate 104.

In an example embodiment, each rivet tab 114 includes surface 130 continuous with side 110 and included in plane P orthogonal to axis of rotation AR. In an example embodiment, thickness 132 of tabs 114, in direction AD1, is uniform and is the same as thickness 134 of body 116 in direction AD1.

Figure 9:
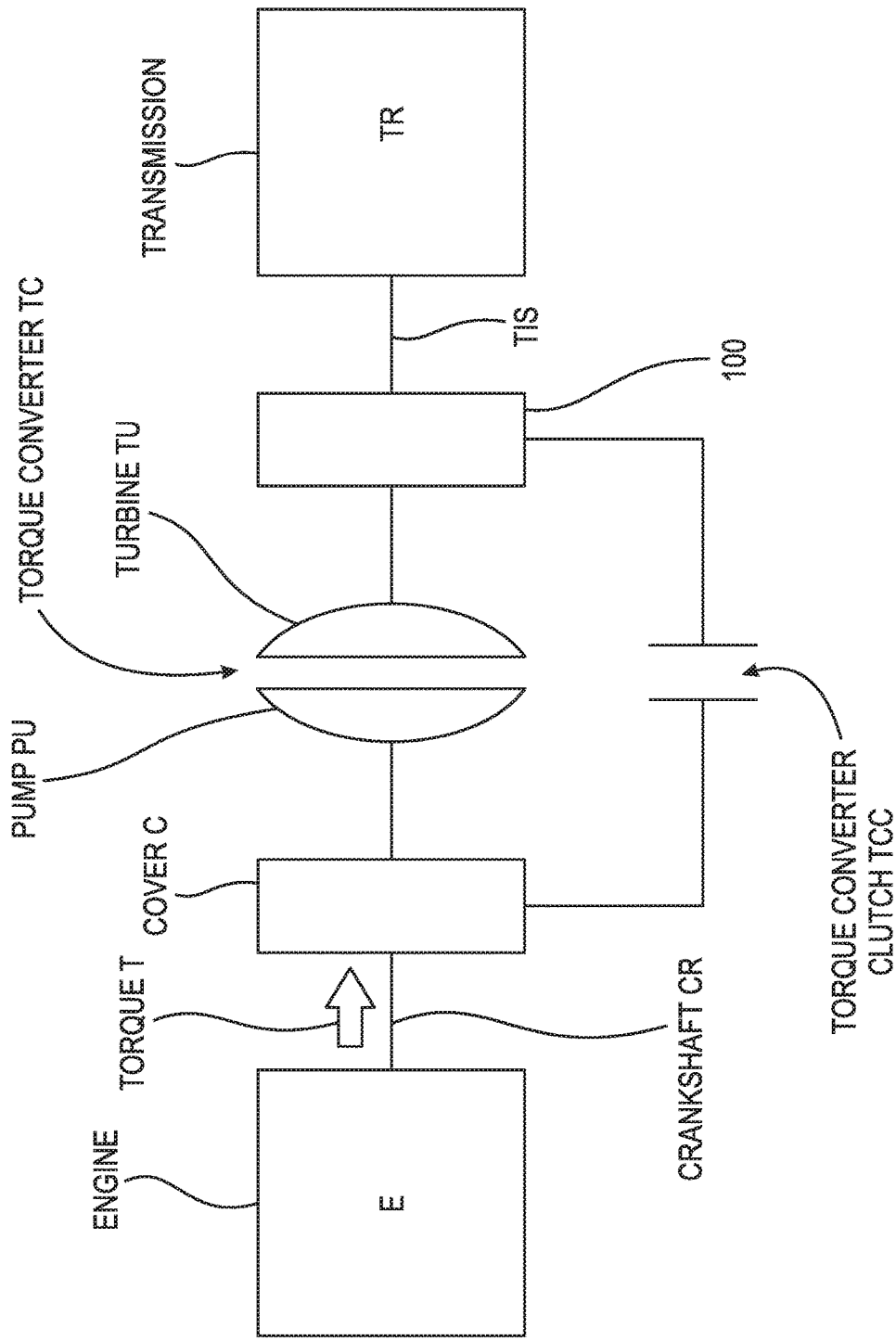
FIG. 9 is a schematic block diagram of an example drive train including the torsional vibration damper shown in FIG. 2; and, FIG. 10 is a front view of the spring retainer plate shown in FIG. 2 with an intermediate plate removed.

FIG. 9 is a schematic block diagram of an example drive train including damper 100. The following should be viewed in light of FIGS. 2 through 9. In an example embodiment, damper 100 includes piston plate 136 (shown only in FIG. 3) arranged to receive torque, for example, from engine E via crankshaft CR. Each spring 124 includes circumferential ends 138 engageable with piston plate 136. In an example embodiment, caps 140 are connected to ends 138.

Figure 10:
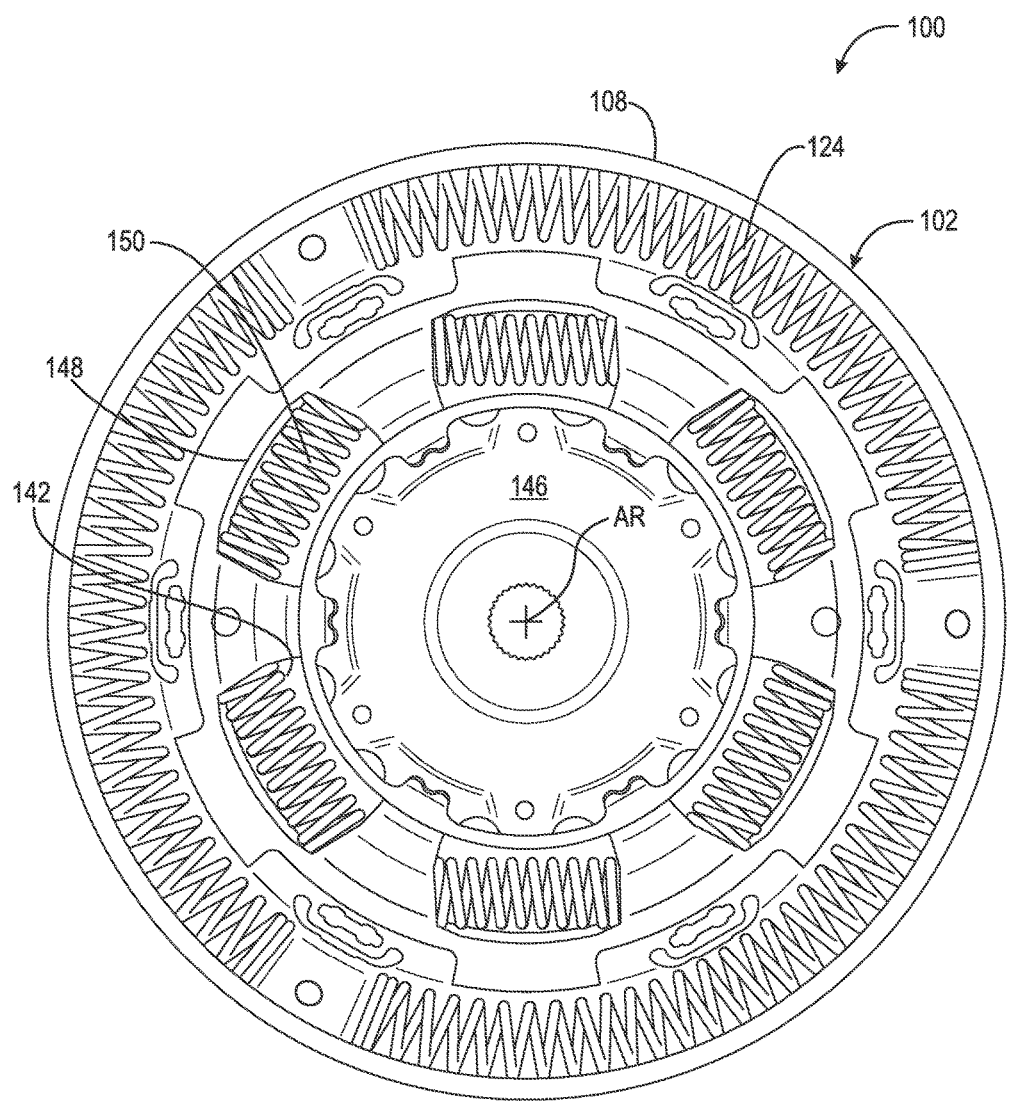

FIG. 10 is a front view of the spring retainer plate shown in FIG. 2 with intermediate plate 104 removed. The following should be viewed in light of FIGS. 2 through 10.

In an example embodiment: spring retainer plate 102 includes openings 142; plate 104 includes openings 144; and damper 100 includes output flange 146, with openings 148, and springs 150 located in openings 142, 144, and 148 and engaged with plates 102 and 104 and flange 146. Flange 146 is arranged to non-rotatably connect to transmission input shaft TIS for transmission TR. Piston plate 136 is arranged to transmit torque T, for example from engine E, to springs 124, springs 124 are arranged to transmit torque T to plate 102 and 104, plates 102 and 104 are arranged to transmit torque T to springs 150, and springs 150 are arranged to transmit torque T to output flange 146.

In an example embodiment, damper 100 is part of torque converter TC including cover C, pump PU non-rotatably connected to cover C, turbine TU, and torque converter clutch TCC. In torque converter mode, clutch TCC is open and torque T is transmitted to damper 100 via pump PU and turbine TU. In lock-up mode, clutch TCC is closed and torque T is transmitted from cover C to damper 100 via clutch TCC.

Advantageously, rivet tabs 114 eliminate the problem noted above with respect to riveting plates 102 and 104. Specifically, rather than being curved like the surrounding portions of plate 102, tabs 114 are substantially planar and orthogonal to axis AR, providing optimal surface 130 for receiving heads 152 for rivets 122. Specifically, an entirety of surface 154 of head 152 is planar and in contact with surface 130, providing maximum holding power and durability for rivets 122. Further, tabs 114 and rivets 122 do not interfere with the operation of springs 124.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A torsional vibration damper, comprising:
an axis of rotation;
a spring retainer plate including:
    a first plurality of openings passing through and wholly surrounded by material forming the spring retainer plate; and,
    a plurality of rivet tabs, each rivet tab including a respective portion aligned with a respective opening from the first plurality of openings so that a first line in an axial direction, parallel to the axis of rotation, passes through the respective portion and the respective opening;
an intermediate plate;
a respective at least one rivet passing through said each rivet tab and connecting the intermediate plate to the spring retainer plate; and,
a first plurality of springs engaged with the spring retainer plate.

2. The damper of claim 1, wherein:
a second line, in a circumferential direction, formed by an end point of a radius rotated about the axis of rotation, passes through said each rivet tab.

3. The damper of claim 1, wherein for said each rivet tab, respective second and third lines, in the axial direction:
pass through the first line and the respective opening from the first plurality of openings; and,
are separated, in the circumferential direction, by said each rivet tab.

4. The damper of claim 1, wherein for each opening in the first plurality of openings, a respective second line, in the axial direction:
passes through said each opening without touching a respective rivet tab at least partially bounded by said each opening; and,
is radially outward of the respective rivet tab.

5. The damper of claim 1, wherein a second line, in a circumferential direction, formed by an end point of a radius rotated about the axis of rotation, passes through the first plurality of openings without passing through the plurality of rivet tabs.

6. The damper of claim 5, wherein the second line passes through the first line.

7. The damper of claim 1, wherein a respective second line, orthogonal to the axis of rotation, passes through the respective opening without passing through the respective portion.

8. The damper of claim 1, wherein the spring retainer plate includes:
a side;
a plurality of edges in the side, each edge in the plurality of edges connecting two adjacent openings from the first plurality of openings in a circumferential direction formed by an end point of a radius rotated about the axis of rotation; and,
a radially outermost curved portion:
    forming substantially a C shape in a radial cross-section; and,
    bordering the plurality of edges.

9. The damper of claim 8, wherein:
a respective portion of each spring in the first plurality of springs is located in the radially outermost curved portion; and,
the curved portion restrains said each spring in the first plurality of springs in a radially outward direction and in the first axial direction.

10. The damper of claim 1, wherein said each rivet tab includes a respective surface included in a plane orthogonal to the axis of rotation.

11. The damper of claim 1, further comprising:
a piston plate arranged to receive torque, wherein:
each spring in the first plurality of springs includes respective circumferential ends; and, the piston plate is engageable with at least one of the respective circumferential ends.

12. The damper of claim 11, wherein the spring retainer plate includes a second plurality of openings, the damper further comprising:
an output flange; and,
a second plurality of springs located in the second plurality of openings and engaged with the output flange and the intermediate plate.

13. The damper of claim 12, wherein:
the piston plate is arranged to transmit the torque to the first plurality of springs;
the first plurality of springs is arranged to transmit the torque to the intermediate plate;
the intermediate plate is arranged to transmit the torque to the second plurality of springs; and,
the second plurality of springs is arranged to transmit the torque to the output flange.

14. A torsional vibration damper, comprising:
an axis of rotation;
a spring retainer plate including:
  a first plurality of openings passing through and wholly surrounded by the spring retainer plate; and,
  a plurality of rivet tabs, each rivet tab including a respective portion positioned such that:
    a respective first line in an axial direction, parallel to the axis of rotation, passes through the respective portion and a respective opening in the first plurality of openings; and,
    a second line, in a circumferential direction formed by an end point of a radius rotated about the axis of rotation, passes through the first plurality of openings and the respective first lines without touching the plurality of rivet tabs;
an intermediate plate;
a respective plurality of rivets passing through said each rivet tab and fixedly connecting the intermediate plate to the spring retainer plate; and,
a first plurality of springs restrained in the axial direction and in a radial direction, orthogonal to the axis of rotation, by the spring retainer plate.

15. The damper of claim 14, wherein a third line, in the circumferential direction:
passes through said each rivet tab; and,
does not pass through portions of the spring retainer plane circumferentially located between the plurality of rivet tabs.

16. The damper of claim 14, wherein for each opening in the first plurality of openings, a respective third line, in the axial direction:
passes through said each opening without touching a respective rivet tab in the plurality of rivet tabs at least partially bounded by said each opening; and,
is radially outward of the respective rivet tab.

17. The damper of claim 14, wherein:
the spring retainer plate includes:
  a plurality of edges, each edge in the plurality of edges connecting, in a circumferential direction, two adjacent openings from the first plurality of openings; and,
  a radially outermost curved portion:
    forming a substantially C shape in a radial cross-section; and,
    bordering the plurality of edges; and,
a respective portion of each spring in the first plurality of springs is located in the radially outermost curved portion.

18. The damper of claim 14, wherein the spring retainer plate includes a second plurality of openings, the damper further comprising:
an output flange; and,
a second plurality of springs located in the second plurality of openings and engaged with the output flange and the intermediate plate.

19. The damper of claim 18, further comprising:
a piston plate arranged to transmit the torque to the first plurality of springs, wherein:
the first plurality of springs is arranged to transmit the torque to the intermediate plate;
the intermediate plate is arranged to transmit the torque to the second plurality of springs; and,
the second plurality of springs is arranged to transmit the torque to the output flange.

20. A torque converter, comprising:
an axis of rotation;
a cover arranged to receive torque;
an impeller non-rotatably connected to the cover;
a turbine; and,
a torsional vibration damper, including:
  an intermediate plate;
  a spring retainer plate including:
    a first plurality of openings passing through and wholly surrounded by material forming the spring retainer plate;
    a plurality of rivet tabs, each rivet tab:
      including a respective second plurality of openings; and,
      aligned with a respective opening from the first plurality of openings in an axial direction parallel to the axis of rotation, each rivet tab including a respective portion positioned such that: a respective first line in an axial direction, parallel to the axis of rotation, passes through the respective portion and a respective opening in the first plurality of openings; and,
    a radially outermost curved portion forming a substantially C shape in a radial cross-section;
  a respective plurality of rivets:
    passing through each respective second plurality of openings; and,
    non-rotatably connecting the intermediate plate to the spring retainer plate; and,
  a plurality of springs disposed in the radially outermost curved portion, wherein a second line, in a circumferential direction, formed by an end point of a radius rotated about the axis of rotation, passes through the first plurality of openings without passing through the plurality of rivet tabs.

* * * * *